UNITED STATES PATENT OFFICE 2,691,161

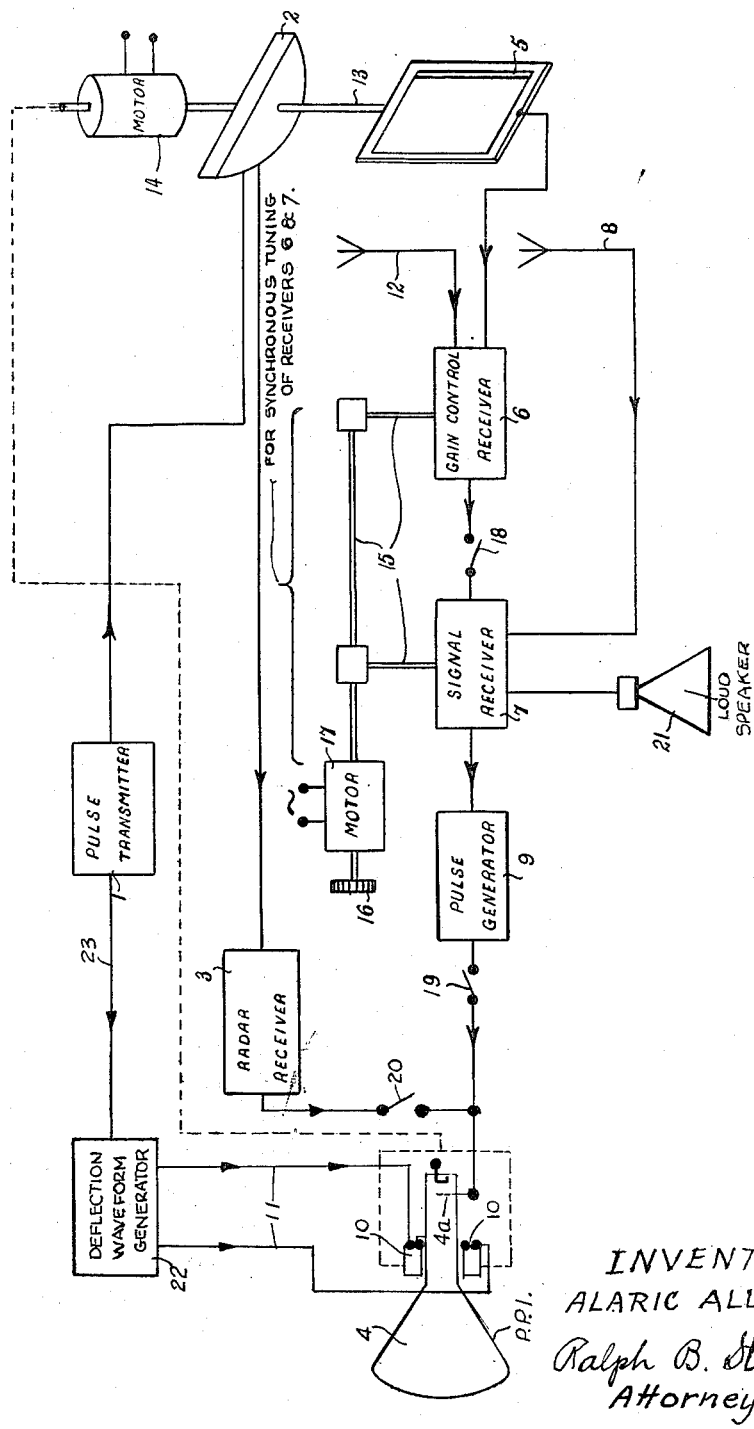
INVENTOR
ALARIC ALLEN
Ralph B. Stewart
Attorney

NAVIGATION SYSTEM, INCLUDING RADIO DIRECTION-FINDING EQUIPMENT

Alaric Allen, London, England, assignor to A. C. Cossor Limited, London, England, a company of Great Britain Application October 1, 1948, Serial No. 52,171

Claims priority, application Great Britain October 3, 1947

4 Claims. (Cl. 343—6)

This invention relates to radio navigation and more particularly to a combined radar and direction finding system therefor.

The invention is concerned with radio navigation systems of the kind which at present employ on the vessel or aircraft two separate radio equipments which have hitherto been entirely independent of each other; these two equipments being a radar apparatus and a direction finding apparatus. One type of radar apparatus in common use is that which comprises means to transmit a regular succession of pulses in the form of a beam from a rotating scanner, means to receive echo signals returned from bodies in the path of the beam, and means to apply these echo signals to an indicating device in such a manner as to enable the distances and/or angular bearings of the said bodies from the craft to be determined. The type of indicating device most generally used is that known as a plan position indicator which shows on the screen of a cathode ray tube a plan view of the terrain surrounding the craft. This cathode ray tube is so arranged that the indicating spot is radially deflected outwards from the centre of the screen at the commencement of each transmitted pulse the spot being brightened at a radial distance from the centre corresponding to the distance of a body from the craft and that the radius is displaced circularly about the origin in synchronism with the rotation of the scanner. In order to fix the position of the craft geographically, recourse is made to a chart and to the information derived from a direction finder.

The use of direction finding equipment depends upon the existence of special radio stations which are fixedly located and which transmit continuous wave radio signals. Each transmitter has its own distinctive frequency within a frequency band special to such, this frequency band being probably very different from that pertaining to the radar. Thus the radar apparatus may be transmitting pulses in the form of bursts of oscillation at a frequency of 10,000 mc./s. whereas the transmitters of the D. F. stations may be operating in a frequency band of say 250–600 kc./s. Lists of these stations showing their operating frequencies and the latitude and longitude of their locations, are published by various official bodies. One common type of direction finder employs a rotating directional aerial coupled to a substantially conventional radio receiver. In operation two or more of the fixed radio stations are located, one at a time, to obtain a position fix. The radio receiver will be tuned to the frequency at which a first station transmits signals and the aerial will be rotated until a sharp minimum of signal strength is observed. This sharp minimum of signal strength depends on the type of aerial employed; if this be of the loop type then this has a sharp minimum of received signal strength when the normal to the loop is in line with the station transmitting the signals. This procedure is repeated in the case of the second transmitting station. Having thus obtained the orientation of the two transmitters, the operator has only to find their intersection on a chart to fix his own location. In order to provide a check on the observations obtained from the two stations, the procedure may be repeated for a third station.

From the above discussion it will be seen that the present radio navigation systems may involve the use of a radar system for relative position fixing of the craft with respect to its near environs and a direction finding system for actual geographical position fixing of itself and/or environs; each system requiring separate observations to be made.

It is an object of the present invention to provide a radio navigation equipment in which the advantages of both the systems referred to are combined, and in which the results of their observations are presented in a single display.

According to this invention radio navigation equipment comprises a radar system for transmitting a train of pulses of radio frequency energy and for receiving such pulses after reflection, a direction-finding system including means for developing a voltage dependent upon the strength of signals received by a directive aerial, means for generating pulses modulated in amplitude in accordance with said voltage, and a circuit arrangement for applying the received radar pulses and the pulses of the direction finding system to a common indicator.

The invention will be described by way of example with reference to the accompanying drawing which illustrates one embodiment thereof diagrammatically.

The radar part of the equipment illustrated includes a pulse transmitter 1 from which pulses in the form of bursts of radio-frequency oscillation are fed to a directive aerial 2, a receiver 3 in which pulses picked up by the aerial 2 after reflection at a distant object are received and demodulated and a cathode ray tube 4 shown as a plan position indicator (P. P. I.), the demodulated pulses from 3 being applied to control the intensity of the beam in the tube 4.

The direction-finding part of the equipment includes a loop aerial 5, a gain control receiver 6 fed from the loop 5, a signal receiver 7 fed from an omni-directional aerial 8 and a pulse generator 9 for generating pulses modulated in amplitude in accordance with a rectified voltage from the output of the signal receiver 7, the pulses from 9 being applied to control the intensity of the beam in the tube 4.

The P. P. I. tube 4 is provided in known manner with well-known means for deflecting the beam of the tube radially from the center thereof in step with the transmission of pulses from transmitter 1, the axis of the radial deflection being rotated about the axis of the tube in synchronism with the rotation of loop 5. Such means may be of the type shown in Figure 34, page 3–54 of the book "Principles of Radar" published in 1946 by McGraw-Hill Book Co., New York, N. Y. According to this arrangement, deflecting coils 10 are arranged to rotate about the axis of the tube 4 and are driven in synchronism with shaft 13 by a suitable driving connection represented by the dotted line 13a. The coils 10 are energized through connection 11 from a sawtooth generator 22 which is controlled by transmitter 1 through connection 23.

An omni-directional aerial 12 is preferably, in known manner, provided in association with the loop 5 in order that the over-all polar diagram may be approximately of the shape of a cardioid and so to resolve sense ambiguity.

The aerials 2 and 5 are mounted upon a common shaft 13 driven by an electric motor 14. The rotation of the deflection axis of the beam in the tube 4 produced by the deflection coils 10 is arranged, as is well known in radar equipment and as explained above, to be in step with the rotation of the aerial 2. The receivers 6 and 7 having their tuning controls ganged as indicated at 15 to enable them to be tuned simultaneously to the same radio frequency by a manual control 16 or by an electric motor 17.

A switch 18 enables the output of the receiver 6 to be disconnected from the reeciver 7; a switch 19 enables the output of the pulse generator 9 to be disconnected from the intensity-control electrode 4a of the tube 4 and a switch 20 enables the application of radar pulses to the same electrode to be interrupted.

The two aerials 2 and 5 are so phased relatively to one another that the maximum signal is picked up by the radar aerial 2 from a direction in which reception by the aerial 5 is a minimum. Considering signals radiated from some given beacon, the aerial 8, being omnidirectional, receives signals from this beacon continuously but the gain of the receiver 7 is arranged to be normally so low that negligible output is obtained therefrom. This low gain may be obtained by a negative voltage developed at the output of the receiver 6 and dependent in magnitude upon the strength of the signal picked up by the aerials 5 and 12, this negative voltage being applied through the switch 18 for example as bias to the control grid of a variable mu valve in the receiver 7. It is arranged that when the aerial 5 has rotated to a position in which the reception from the aerials 5, 12 is a minimum, the negative bias voltage has dropped to a low value whereby the gain of the receiver 7 is high and signals picked up by the aerial 8 are passed, after rectification, at considerable amplitude to the pulse generator 9. It will therefore be understood that the receiver 6 acts as a gain-control receiver to control the gain of the receiver 7. Because the aerial 5 is rotating the duration of each minimum signal from a given beacon is short and hence the signal pased to the pulse generator 9 is in the form of a pulse. As the aerial 5 rotates, therefore, a pulse of voltage will appear at the output of the receiver 7 each time the aerial 5 is in its minimum pick-up position with respect to a transmission received by the aerial 8. This voltage pulse serves to trigger or modulate the pulse generator 9, such as a multivibrator, which generates a short voltage pulse. The voltage pulse from the receiver 7 is in general not sufficiently sharp to be suitable for application directly to the tube 4. Since the beam in the tube 4 is rotating and oscillating radially, these pulses serve to produce on the screen of the tube bright radial lines. Since the rotation of the beam is synchronised and phased with the rotation of the aerial 5, the angular position of the radial lines will give an indication of the bearing of the station being received at any instant.

It is of course to be understood that directive aerial systems other than those shown may be used.

The radar part of the equipment may be operated in known manner. One way of operating the direction-finding part is as follows:

When it is desired to obtain a bearing upon a known transmitting station, receivers 6 and 7 are tuned manually and the switch 18 is opened to allow for continuous reception of a signal from the desired transmitter in spite of rotation of the aerial 5. The desired signal may be tuned in with the aid of a loudspeaker 21. When the desired signal has been tuned-in, the switch 18 is closed and so long as the switch 19 is closed a radial line is produced on the screen of the tube 4 from which the bearing of the desired station from the receiving station is read off.

Another mode of operation is to vary the tuning of the receivers 6 and 7 cyclically by the motor 17 with the switches 18 and 19 closed. The tuning is arranged to vary slowly in comparison with the scanning by the aerials. There will then be produced on the screen of the tube 4 radial lines corresponding to the bearings of all stations from which signals are received at sufficient strength. Any one of these lines can be selected, the approximate frequency setting of the receivers when the selected line is produced may be noted and the receivers 6 and 7 may then be tuned manually exactly to the desired signal as already described with the switch 18 open in order to identify the station from which the signals originate.

The radar equipment may be operated simultaneously or alternately with the direction-finding equipment. If it may be desired to operate the direction-finding equipment when the radar transmitter 1 is not operating, an auxiliary circuit may be provided to produce the radial deflection of the cathode ray beam.

The arrangement described may be operated according to the invention without the receiver 7, the output of the receiver 6 being applied directly to the pulse generator in such a manner as to generate a pulse in response to minimum output from the receiver 6. This is, however, not usually as satisfactory as the arrangement described for several reasons, one of which is that it is not satisfactory when the signals received are interrupted as in I. C. W.

Known automatic tuning means may be included in the receivers 6 and 7 whereby these receivers lock on to and remain tuned to a selected signal, for instance, the first signal received above a predetermined amplitude or any signal within a narrow frequency band.

I claim:

1. Radio navigation equipment comprising an omnidirectional aerial system, a signal receiver connected to be fed by said aerial system, a rotatably-mounted directive aerial system, a first receiver connected to be fed by said directive aerial system, means for deriving a first voltage dependent upon the strength of signals fed to said first receiver, means for applying said first voltage to control the gain of said signal receiver, means for deriving a second voltage dependent upon the strength of signals at the output of said signal receiver, a pulse generator controlled by said second voltage for generating pulses modulated in amplitude in accordance with said second voltage, a cathode ray tube, means for deflecting the beam of said tube radially in directions fixedly related to the orientation of said directive aerial system and means for applying said pulses to control the intensity of said beam.

2. Radio navigation equipment according to claim 1, wherein said first and signal receivers include ganged tuning means for varying the tuning of these receivers in step with one another.

3. Radio navigation equipment according to claim 1, comprising an electric motor for producing a cyclic variation of the tuning of said first and signal receivers.

4. Radio navigation equipment comprising a directional aerial system movable through a predetermined range of displacement, means to derive a unidirectional voltage dependent upon the strength of signals received by said aerial system from a transmission, a receiver of the said transmision including an aerial separate from said aerial system, means to apply said unidirectional voltage to control the gain of said receiver in a sense to increase the said gain in response to a decrease in pick-up by said aerial system, a cathode ray tube bearing indicator, means to displace the cathode ray beam of said tube in correspondence with displacements of said aerial system and means to apply the output of said receiver to said indicator to produce therein an indication of the bearing of said transmission.

References Cited in the file of this patent

UNITED STATES PATENTS

| Number | Name | Date |
|---|---|---|
| 2,252,083 | Luck | Aug. 12, 1941 |
| 2,400,641 | Hardy | May 21, 1946 |
| 2,409,456 | Tolson et al. | Oct. 15, 1946 |
| 2,428,793 | Fay | Oct. 14, 1947 |
| 2,448,016 | Busignies | Aug. 31, 1948 |
| 2,456,666 | Agate et al. | Dec. 21, 1948 |
| 2,537,102 | Stokes | Jan. 9, 1951 |
| 2,582,962 | Burroughs | Jan. 22, 1952 |
| 2,597,895 | Novy | May 27, 1952 |
| 2,633,568 | Greene | Mar. 31, 1953 |

FOREIGN PATENTS

| Number | Country | Date |
|---|---|---|
| 923,758 | France | Feb. 24, 1947 |